(12) United States Patent
Watanabe

(10) Patent No.: US 10,564,387 B2
(45) Date of Patent: Feb. 18, 2020

(54) LENS DRIVE DEVICE AND LENS DRIVE METHOD

(71) Applicant: Olympus Corporation, Hachioji-shi, Tokyo (JP)

(72) Inventor: Yuko Watanabe, Hachioji (JP)

(73) Assignee: Olympus Corporation, Tokyo (JP)

( * ) Notice: Subject to any disclaimer, the term of this patent is extended or adjusted under 35 U.S.C. 154(b) by 255 days.

(21) Appl. No.: 15/814,412

(22) Filed: Nov. 16, 2017

(65) Prior Publication Data

US 2018/0143396 A1 May 24, 2018

(30) Foreign Application Priority Data

Nov. 22, 2016 (JP) .................................. 2016-227106

(51) Int. Cl.
  *G02B 15/14* (2006.01)
  *G02B 7/09* (2006.01)
  *G03B 3/10* (2006.01)

(52) U.S. Cl.
  CPC ........... *G02B 7/09* (2013.01); *G03B 3/10* (2013.01)

(58) Field of Classification Search
  CPC ....................................................... G02B 7/09
  USPC ........................................................ 359/696
  See application file for complete search history.

(56) References Cited

U.S. PATENT DOCUMENTS

| 4,969,003 A * | 11/1990 | Ohnuki ..................... | G02B 7/36 250/201.2 |
| 5,111,230 A * | 5/1992 | Kobayashi ................ | G03B 3/10 396/133 |
| 2010/0329665 A1* | 12/2010 | Yamada ..................... | G03B 9/02 396/508 |

FOREIGN PATENT DOCUMENTS

JP 2001-178193 6/2001

* cited by examiner

*Primary Examiner* — James C. Jones
(74) *Attorney, Agent, or Firm* — John C. Pokotylo; Pokotylo Patent Services

(57) ABSTRACT

A controller within a lens drive device, the controller comprising an open loop control section that performs open loop control of the stepping motor using a given excitation position change and a given drive voltage, and a closed loop control section that, at the time of rotating the stepping motor, calculates tracking lag for change in rotational position for change in excitation position, and performs closed loop control of drive speed and drive voltage of the stepping motor in accordance with a control error, which is a difference between target tracking lag and tracking lag, wherein the closed loop control section performs at least open loop control of drive voltage during an acceleration operation of the stepping motor, as well as closed loop control of drive voltage and drive speed in accordance with control error by transitioning to closed loop control of drive voltage when an acceleration operation is completed.

15 Claims, 8 Drawing Sheets

LENS DRIVE DEVICE AND LENS DRIVE METHOD

CROSS-REFERENCE TO RELATED APPLICATIONS

Benefit is claimed, under 35 U.S.C. § 119, to the filing date of prior Japanese Patent Application No. 2016-227106 filed on Nov. 22, 2016. This application is expressly incorporated herein by reference. The scope of the present invention is not limited to any requirements of the specific embodiments described in the application.

BACKGROUND OF THE INVENTION

1. Field of the Invention

The present invention relates to a lens drive device and lens drive method for an imaging apparatus and an interchangeable lens type imaging apparatus.

2. Description of the Related Art

With an imaging apparatus such as a digital camera, it is necessary to make an autofocus function high-speed and high accuracy due to the high-speed and high number of pixels of an image sensor. There has also been high demand for lenses having features such as a fast lens that has a large aperture, a telephoto lens having long focal length, or a macro lens having a high degree of image magnification ratio etc. There has thus been demand to move lenses that are heavy compared to a focus lens drive device, and to move over a long stroke at high speed.

In driving a focus lens, a stepping motor is often used from the viewpoint of cost and size. With a stepping motor, a phenomenon known as step-out occurs if speed is too fast with respect to a load. Step-out is where synchronous speed is not maintained, due to significant fluctuation in load and power supply etc. when a stepping motor is rotated at a given frequency (given number of input pulses). If step-out arises, instructed position and actual position vary, and so a maximum speed is determined ensuring sufficient safety factor for load assumed at the design stage.

If sufficient safety factor is ensured taking into consideration step-out, it is not possible to make the most of the stepping motor performance and there is inefficiency. There has therefore been proposed, in Japanese Patent laid-open No. 2001-178193 (hereafter referred to as patent publication 1), a method in which a sensor is fitted to a stepping motor, rotational position of the stepping motor is constantly detected, feedback control is carried out so that a difference between detected position and a motor position command signal becomes zero, and performance of the stepping motor is maximized.

However, with the lens drive device disclosed in patent publication 1, since feedback control is continuously carried out, for commencement of a motor position command signal, a difference between current position and a motor command signal becomes temporarily large since tracking of a load is delayed due to starting friction and inertia. This means that speed and rotation direction of the motor are controlled abruptly so as to cancel the difference, extreme speed reduction and transient reversal phenomenon arise making feedback control unstable, and it is not possible to commence operation smoothly and in a short time.

Therefore, in order to solve this, a method has been considered where a detector that detects rotational position of a rotor of a stepping motor is provided, tracking lag of change in rotational position for change in excitation position when causing the motor to rotate is calculated, a difference from a target tracking lag is obtained as a control error, a balance between generated torque of the motor and load torque is acquired by controlling drive speed and drive voltage of the motor based on this control error, and operation is carried out at a target speed while preventing step-out as much as possible.

The above described method is used for carrying out lens drive at high speed, avoiding step-out by carrying out closed loop control of speed and voltage (hereafter referred to as "FB control"), in a speed region in which it is not possible to sufficiently ensure safety factor of generated torque of a motor, with respect to an assumed load torque. For lens startup, it is possible to prevent the occurrence of an unstable state at the time of FB control transition by commencing FB control at a point in time when a given speed is attained, and commencing FB control looking at tracking lag amount value and direction of change for target tracking lag.

However, with this method, in the case of carrying out lens drive at low-speed, that is, in a state where tracking lag is extremely small compared to target tracking lag (low-speed region in which safety factor can be sufficiently ensured), maintaining stability of FB control is difficult. Specifically, if speed of moving to FB control, in accordance with the case of carrying out lens drive at low speed, is lowered and FB control is carried out from a low-speed state, balance between voltage control and speed control until a target speed is reached is degraded. This means that time required for acceleration is longer than for the case when FB control is not carried out, and when an acceleration operation is completed and there is a transition to constant speed operation, control is not stable. Accordingly, expectations with respect to reducing power supply consumption as much as possible from low speed to high speed, and desired performance that a heavy lens can be driven at high speed, for such as a zoom lens, can not be satisfied.

SUMMARY OF THE INVENTION

The present invention provides a lens drive device and a lens drive method that carry out FB control from low speed to high speed, with low power consumption.

A lens drive device of a first aspect of the present invention comprises a sensor for detecting rotational position of a stepping motor, and a controller for carrying out control of the stepping motor, the controller comprising: an open loop control section that performs open loop control of the stepping motor using a given excitation position change and a given drive voltage, and a closed loop control section that, at the time of rotating the stepping motor, calculates tracking lag for change in rotational position for change in excitation position, and performs closed loop control of drive speed and drive voltage of the stepping motor in accordance with a control error, which is a difference between target tracking lag and tracking lag, wherein the closed loop control section performs at least open loop control of drive voltage during an acceleration operation of the stepping motor, as well as closed loop control of drive voltage and drive speed in accordance with control error by transitioning to closed loop control of drive voltage when an acceleration operation is completed.

A lens drive method of a second aspect of the present invention, that carries out open loop control of a stepping motor using a given excitation position change and a given drive voltage, detects rotational position of the stepping motor, calculates tracking lag of change in rotational position for change in excitation position, when the stepping motor is made to rotate, and performs closed loop control of drive speed and drive voltage of the stepping motor in accordance with a control error, which is a difference between target tracking lag and tracking lag, wherein the lens drive method further performs at least open loop control of drive voltage during an acceleration operation of the stepping motor, as well as closed loop control of drive voltage and drive speed in accordance with control error by transitioning to closed loop control of drive voltage when an acceleration operation is completed.

A non-transitory computer-readable medium of a third aspect of the present invention, storing a processor executable code, which when executed by at least one processor, performs a lens drive method, processor executable code executing a lens drive method for a lens drive device that performs open loop control of the stepping motor using a given excitation position change and a given drive voltage, detects rotational position of the stepping motor, calculates tracking lag of change in rotational position for change in excitation position when the stepping motor is made to rotate, and performs closed loop control of drive speed and drive voltage of the stepping motor in accordance with a control error, which is a difference between target tracking lag and tracking lag, the lens drive method comprising performing at least open loop control of drive voltage during an acceleration operation of the stepping motor, as well as closed loop control of drive voltage and drive speed in accordance with control error by transitioning to closed loop control of drive voltage when an acceleration operation is completed.

DETAILED DESCRIPTION OF THE PREFERRED EMBODIMENTS

An example where a digital camera is adopted as a preferred embodiment of the present invention will be described in the following. This camera converts a subject image, that has been formed by an optical lens within a lens barrel section, to image data, subjects the subject image to live view display on a display that is arranged on the rear surface of a camera body, based on this converted image data, and stores image data for a still picture or movie in a storage medium. In tandem with a half press operation of a release button or the like focus detection is carried out using a contrast method or phase difference method etc., and an optical lens is moved to an in-focus position using drive of a stepping motor in accordance with the result of focus detection.

When moving to an optical lens in-focus position, in the event of control error of less than 0 without the instructed speed being attained, at the time of drive commencement, drive of the stepping motor is carried out using open loop control (also called "open control") with a predetermined pattern. Then, if the drive speed has reached the instructed speed, or if given conditions are satisfied, such as control error being greater than 0, drive of the stepping motor is carried out using closed loop control (also called "feedback control") (refer, for example, to S8, S11 and time t21 in FIG. 5, time t21 in FIG. 6, and time t31 in FIG. 7). It should be noted that the control error value is the difference between tracking lag of change in rotational position for change in excitation position at the time of causing the motor to rotate, and a target tracking lag.

Figure 1:
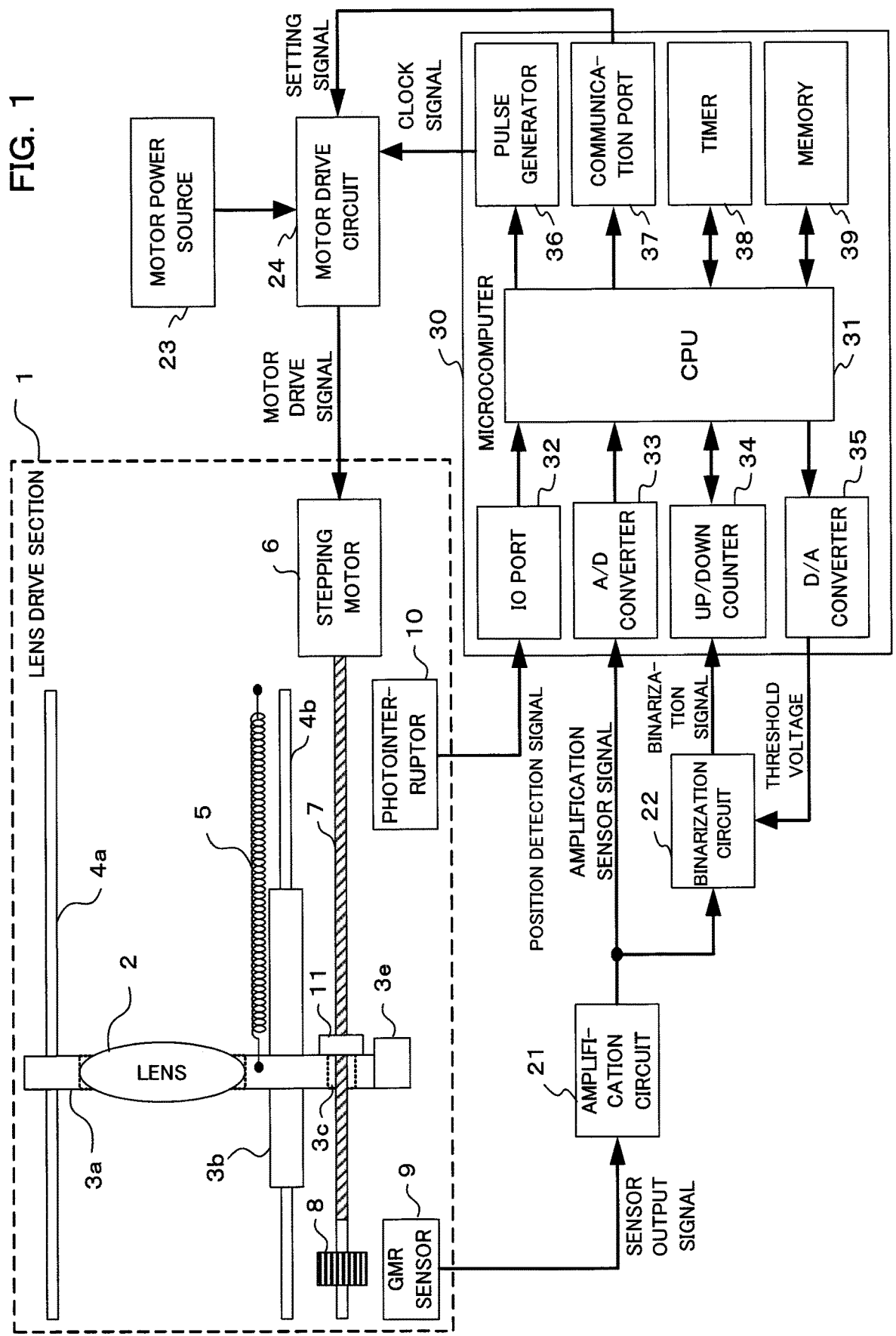
FIG. 1 is a block diagram showing the structure of a camera relating to a first embodiment of the present invention.

A first embodiment of the present invention will be described in the following in accordance with the drawings. FIG. 1 is a block diagram showing the mechanical structure of a lens drive section of a camera of this embodiment, and mainly showing the electrical structure relating to lens drive of the camera.

A lens drive section 1 is arranged inside a camera with a built-in lens or inside the interchangeable lens of an interchangeable lens camera. Inside the lens drive section 1 there are provided an optical lens (hereafter abbreviated to "lens") 2, a lens frame 3, guide shafts 4a, 4b, a spring 5, a stepping motor 6, lead screw 7, scale magnet 8, GMR (Giant Magneto Resistive Effect) sensor 9, and photo-interrupter 10.

The lens 2 has a plurality of or a single optical lens, and forms a subject image. The lens 2 is held in the lens frame 3. The guide shaft 4a and the guide shaft 4b that is provided parallel to the guide shaft 4a are shafts that extend in the optical axis direction of the lens 2, and are fixed to a lens frame or the like. The spring 5 is a tension spring, and is provided between the lens frame 3 and a fixing member of the lens barrel, and imparts an urging force toward the right side direction, in the drawing, to the lens frame 3.

The previously described lens frame 3 has a fixed section 3a that extends in a direction orthogonal to the optical axis direction of the lens 2, and an engagement section 3b, that is integral with this fixed section 3a, and is engaged with the guide shaft 4b. The lens frame 3 also has a through hole 3c through which the lead screw 7 passes, and a light shielding wing 3e. The light shielding wing 3e is integral with the fixed section 3a and is provided on one end of the fixed section 3a. As will be described later, the light shielding wing 3e shields light that has been projected from a light emitting section of the photo-interrupter 10 when the lens 2 has been moved to a reference position.

The stepping motor 6 receives a two-phase pulse signal that is made up of an A phase and a B phase, as a motor drive signal, from a motor drive circuit (motor driver) 24, and performs rotational drive. The stepping motor 6 is a stepping motor that drives the lens. A rotational drive shaft of the stepping motor 6 is integral with the lead screw 7. As a result the lead screw 7 is rotated forwards and backwards in response to the motor drive signal that has been applied to the stepping motor 6.

If the lead screw 7 is turned backwards or forwards, the lens 2 is moved in the optical axis direction by means of a nut 11 that has been meshed with the lead screw 7. This nut 11 is separate from the lens frame 3. The lens frame 3 is drawn in the right direction in FIG. 1 by the spring 5, and reaches a state where a periphery of the through hole 3c becomes abutted against the nut 11 that is meshed with the lead screw 7. Since a rotation stop (not shown) for the nut 11 is provided on the lens frame 3, if the lead screw 7 is rotated the nut 11 is moved in the left or right direction, and the lens frame 3 abutted against the nut 11 is also moved in the optical axis direction.

The scale magnet 8 is provided integrally on one end of the lead screw 7, and has S poles and N poles magnetized alternately along the circumferential surface. The GMR sensor 9 is arranged at a position opposite to the scale magnet 8, and outputs a two-phase signal in accordance with magnetic fields generated by the S poles and N poles of the scale magnet 8. A relative rotational position of the stepping motor 6 (relative position of the lens 2 in the optical axis direction) can be detected using detection signals of the scale magnet 8 and the GMR sensor 9. In this embodiment, the scale magnet 8 and the GMR sensor 9 function as a detection sensor for detecting rotational position of the stepping motor.

The photo-interrupter 10 is fixed to a lens barrel or the like, and has a light emitting section and a light receiving section. If the lens 2 is moved to a reference position, projected light from the light emitting section is shielded by the light shielding wing 3e. The light receiving section changes output once a light shielding state is reached, and as a result it is possible to detect that the lens 2 is at the reference position. Specifically, it is possible to detect absolute position of the lens 2 using the light shielding wing 3e and the photo-interrupter 10. A position detection signal from the photo-interrupter 10 is output to an IO port 32.

In this way, with the lens drive section 1 of this embodiment the nut 11 is moved linearly by rotation of the lead screw 7 that is driven by the stepping motor 6, and the lens frame 3 is moved along the guide shafts 4a and 4b. As a result the lens 2 that is fixed to the lens frame 3 is moved in the optical axis direction. Also, the scale magnet 8 is attached to a tip end of the lead screw 7 at a position opposite to the GMR sensor 9, and if the lead screw rotates forward or backward the scale magnet 8 also rotates in the same direction.

Output of the GMR sensor 9 is connected to an amplifier circuit 21. The amplifier circuit 21 respectively amplifies two-phase analog sensor output signals from the GMR sensor 9, and carries out noise removal processing for the sensor signals. Amplified sensor signals that have been processed by the amplifier circuit 21 are output to an A/D converter 33 and a binarization circuit 22.

The binarization circuit 22 respectively performs binarization on the two-phase sensor output signals from the amplifier circuit 21, and outputs binarized signal to an up/down counter (two-phase counter) 34. In the binarization, the binarization circuit 22 is input with a threshold voltage from a D/A converter 35, and performs binarization using this threshold voltage.

A microcomputer 30 has a CPU (Central Processing Unit) 31 and peripheral circuits for the CPU, and carries out overall lens drive control. Specifically, the microcomputer 30 generates various signals for drive of the stepping motor 6 in response to various signals from the lens drive section 1, for example. As peripheral circuits, an I/O (input/output) port 32, an A/D (analog/digital) converter 33, up/down counter 34, D/A (digital/analog) converter 35, pulse generator 36, communication port 37, timer 38, and memory 39 are provided.

With this embodiment, the CPU 31 and a program that has been stored in the memory 39 function as a controller that carries out control of the stepping motor. This controller has an open loop control section that performs open loop control of the stepping motor using a given excitation position change and a given drive voltage (for example, S13 in FIG. 5). This control also has a closed loop control section that, at the time of rotating the stepping motor, calculates tracking lag for change in rotational position for change in excitation position, and performs closed loop control of drive speed and drive voltage of the stepping motor in accordance with a control error, which is a difference between target tracking lag and tracking lag (for example, S11 in FIG. 5). The closed loop control section also performs at least open loop control of drive voltage during an acceleration operation of the stepping motor, as well as closed loop control of drive voltage and drive speed in accordance with control error by transitioning to closed loop control of drive voltage when an acceleration operation is completed (for example, S8 Yes or S6 Yes→S11 in FIG. 5). With this embodiment, the closed loop control section and the open loop control section are realized using circuits that includes software, but this is not limiting and they may also be realized using hardware circuits.

The IO port 32 is input with a position detection signal from the photo-interrupter 10, and based on this position detection signal outputs a signal indicating that the lens 2 is at a reference position to the CPU 31.

The A/D converter 33 is input with A phase and B phase amplification sensor signals from the amplifier circuit 21, carries out AD conversion on the respective signals to convert the A phase and B phase amplification sensor signals to digital data, and outputs the digital data to the CPU 31.

The D/A converter 35 is input with a digital value corresponding to the threshold voltage from the CPU 31, converts this digital value to analog voltage, and outputs as a threshold voltage to the binarization circuit 22. There maybe situations where a midpoint potential of the sensor signal, that has been output from the GMR sensor 9 and amplified, is offset due to characteristics of the GMR sensor 9 and due to the amplifier circuit 21. For this reason a midpoint potential for the A phase and B phase is previously stored in the memory 39 as an adjustment value, and the binarization circuit 22 carries out binarization using the midpoint potential as a threshold voltage.

The up/down counter 34 is input with a binarization signal from the binarization circuit 22 and carries out up/down counting. The GMR sensor 9 outputs A phase and B phase sensor signals, and carries out up/down counting each time a binarization signal is input. In this way it is possible to determine whether the scale magnet 8 rotates forward or rotates backwards, that is, it is possible to determine in which direction the lens 2 is moving.

The memory 39 has an electrically rewritable volatile memory (for example, a DRAM (Dynamic Random Access Memory) etc.) and an electrically rewritable nonvolatile memory (for example, flash ROM (Flash Read Only Memory) etc.). Programs for execution by the CPU 31, and various data such as various adjustment values for the lens (for example, values relating to the previously described midpoint potential) and setting values for lens drive etc. are stored in the memory 39.

The timer 38 generates control cycles for feedback control, and performs timing operations for carrying out measurement of time for various operations of the lens. The timer 38 also has a calendar function. The communication port 37 is a port for carrying out the exchange of signals externally to the CPU 31. With this embodiment various communication is carried out by means of the communication port 37, for example transmission of setting signals from the communication port 37 to a motor drive circuit 24.

The pulse generator 36 receives control signals from the CPU 31 and generates a clock signal (pulse signal) that is output to the motor drive circuit 24 for use in drive of the stepping motor 6. Specifically, the pulse generator 36 outputs a clock signal to the motor drive circuit 24 and advances excitation position of the stepping motor.

The motor drive circuit 24 receives supply of a power supply voltage from the motor power supply 23, and is also input with a clock signal from the pulse generator 36 and setting signals from the communication port 37, and outputs a motor drive signal made up of two phase voltage signals to the stepping motor 6. Also, when outputting the motor drive signal, the motor drive circuit 24 carries out adjustment of a maximum applied voltage for the motor drive signal based on a setting signal from the CPU 31. The motor power supply 23 has a power supply such as a battery, and supplies power to the motor drive circuit 24 by making a constant voltage using a constant voltage circuit or the like.

In generating the motor drive signal, the CPU 31 within the microcomputer 30 carries out computation based on a sensor output signal that has been detected by the GMR sensor 9, and carries out various computational processing on digital data that is required in management of drive pulses output by the motor drive circuit 24, setting of drive speed, setting of drive voltage, and feedback control.

Figure 2:
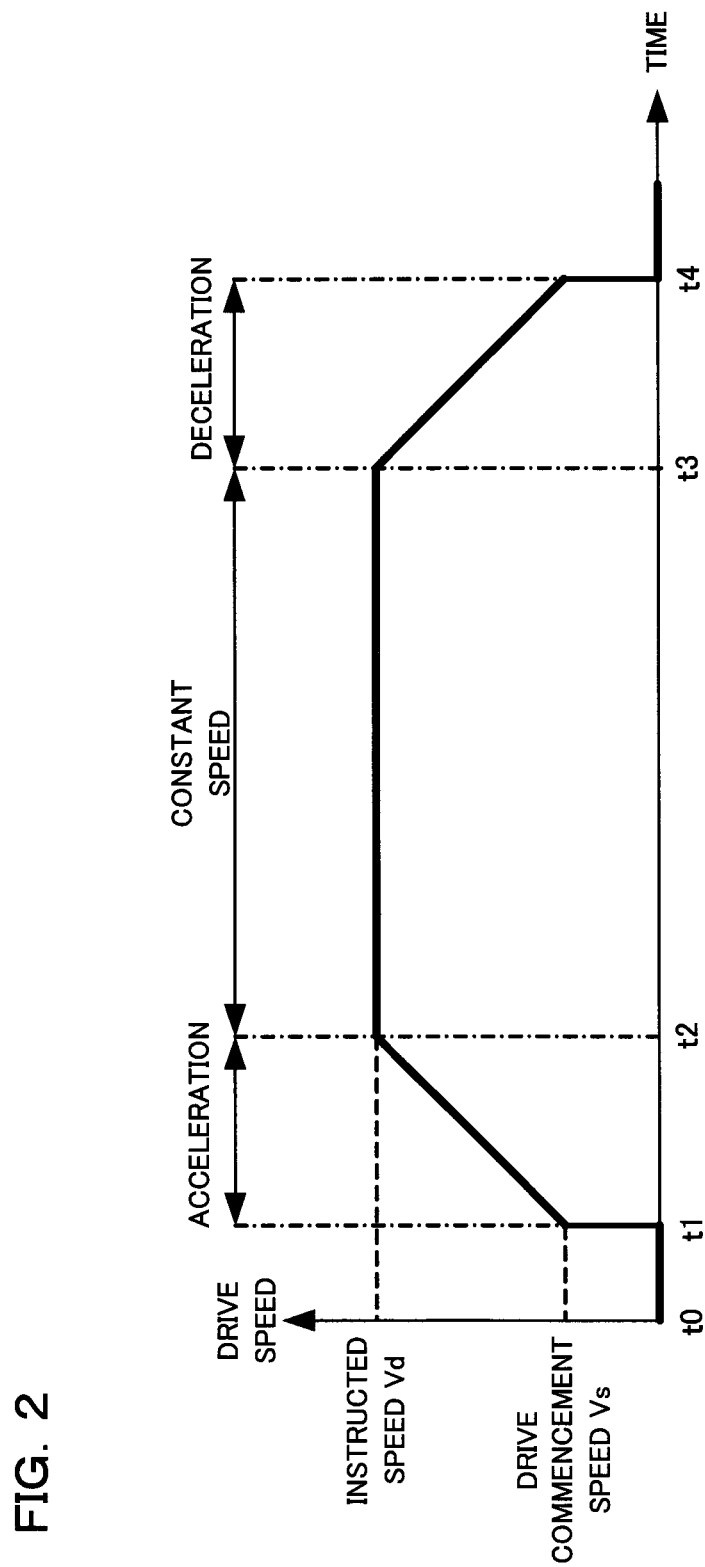
FIG. 2 is a graph showing stepping motor speed control in the camera of the first embodiment of the present invention.

Next, drive control using the stepping motor 6 will be described using FIG. 2. FIG. 2 shows change in drive speed using the stepping motor 6. In FIG. 2, the horizontal axis represents time and the vertical axis represents drive speed.

In order to carry out lens drive at high speed, initial speed is kept low in order to give large pull-in torque of the stepping motor. With the example shown in FIG. 2, at time t1 drive commences with drive commencement speed Vs as an initial speed, acceleration control is carried out to gradually increase the speed, and speed is increased up to a speed that has been instructed while preventing step-out. At time t2, if the instructed speed Vd has been attained constant speed control is carried out at the instructed speed Vd. At time t3, if a target drive amount is approached deceleration control is carried out to gradually reduce the speed, and at time t4 the motor is stopped at a position corresponding to the target drive amount.

In order to prevent step-out of the stepping motor, drivable speed in the constant speed period is restricted to the instructed speed Vd so that motor torque, that is lowered as the speed rises, has a safety factor several times that designed for, with respect to load torque. By subjecting speed to closed loop control by monitoring offset between excitation position and rotational position of the stepping motor (control error), it is possible to make designed safety factor small, and drivable speed in the constant speed period can be made even higher.

Next, in order to understand the feedback control of this embodiment, first, transition determination for from open control, where feedback control is not performed, to feedback control, in a case where feedback control is carried out in speed a region where safety factor is small in order to increase drive speed in the constant speed period, will be described using the flowchart shown in FIG. 3. If drive of the stepping motor 6 is commenced, the flow for determination shown in FIG. 3 is repeatedly executed from step S1 at a given timing until drive of the stepping motor 6 is stopped.

Figure 3:
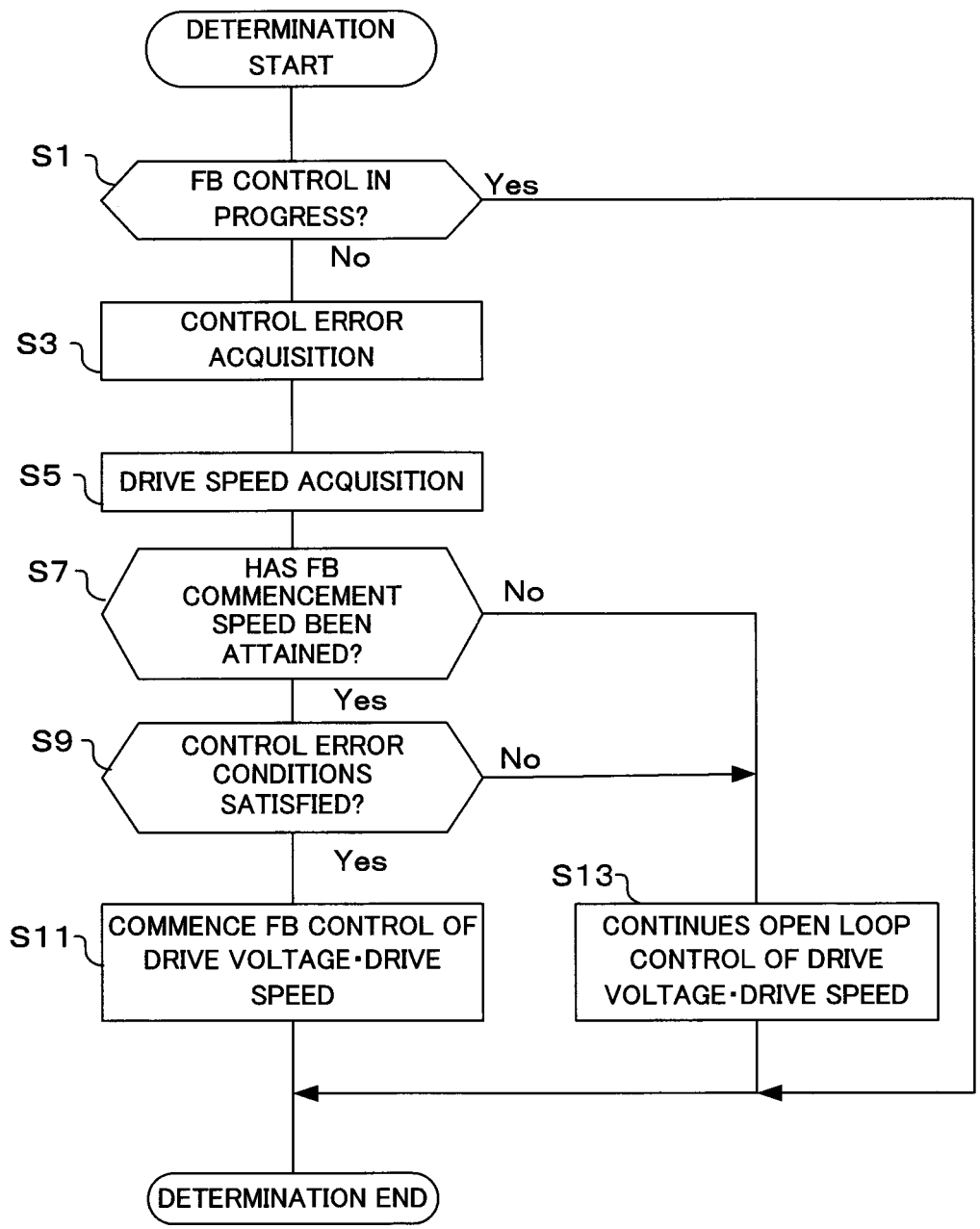
FIG. 3 is a flowchart showing a determination operation for a case control of the first embodiment of the present invention is not carried out.

If the flow for determination in FIG. 3 is commenced, it is first determined whether or not feedback (FB) control is being carried out (S1). Immediately after drive of the stepping motor 6 has been commenced, there is open loop control (open control), and if feedback control conditions are satisfied FB control commences in step S11, which will be described later. In this step (S1) it is determined whether or not the FB control of step S11 has been commenced. If the result of this determination is that FB control is in progress, FB control continues and this flow is terminated.

On the other hand, if the result of determination in step S1 is that FB control is not in progress, a control error is acquired (S3). The control error is a difference between current tracking lag and target tracking lag. Current tracking lag is calculated as tracking lag for change in rotational position corresponding to change in excitation position at the time of causing the motor to rotate. Excitation position of the motor based on a setting signal and the number of the clock signals output from the CPU 31 to the motor drive circuit 24. Also, change in rotational position of the motor is detected based on data from the A/D converter 33 on the basis of output of the GMR sensor 9.

If the control error has been acquired, next drive speed is acquired (S5). Drive speed is speed of change of motor excitation position, and during open control, changes for every given period or every given drive amount (amount that excitation position has been changed) in accordance with a predetermined speed pattern. In this step speed at which excitation position of the motor that is currently set is changed is acquired.

If drive speed has been acquired, it is next determined whether or not FB commencement speed has been attained (S7). Drive speed at which FB control is commenced is stored in advance in the memory 39, and in this step determination is performed by comparing drive speed that was acquired in step S5 with the FB commencement speed stored in the memory 39.

If the result of determination in step S7 is that the FB commencement speed has been attained, it is next determined whether or not control error conditions have been satisfied (S9). Here it is determined whether or not the control error that was acquired in step S3 and a condition set in advance and stored in the memory 39 (for example, control error≥0) has been satisfied.

If the result of determination in step S7 is that the FB commencement speed has not been reached, or if the result of determination in step S9 is that the control error condition has not been satisfied, drive voltage and drive speed open loop control continues (S13). The drive voltage and drive speed for the case of open loop control are stored in advanced in table form in the memory 39, and drive control for the stepping motor 6 is executed in accordance with this stored data.

On the other hand, if the result of determination in step S9 is that the control error condition has been satisfied, FB control for drive voltage and drive speed is commenced (S11). Here, drive speed and drive voltage of the stepping motor 6 are controlled based on the control error that was obtained in step S3. The stepping motor 6 is operated at a target speed as much as possible while maintaining a balance between generated torque and load torque and also preventing step-out.

If the open loop control continues in step S13, or if FB control is commenced in step S11, the flow for determination is terminated. The flow for determination is restarted at the next given time, and is repeatedly executed until drive of the stepping motor 6 is stopped.

Here, description will be given of a problem at the time of carrying out lens drive using feedback control at a lower speed, in order to reduce power consumption.

Figure 4:
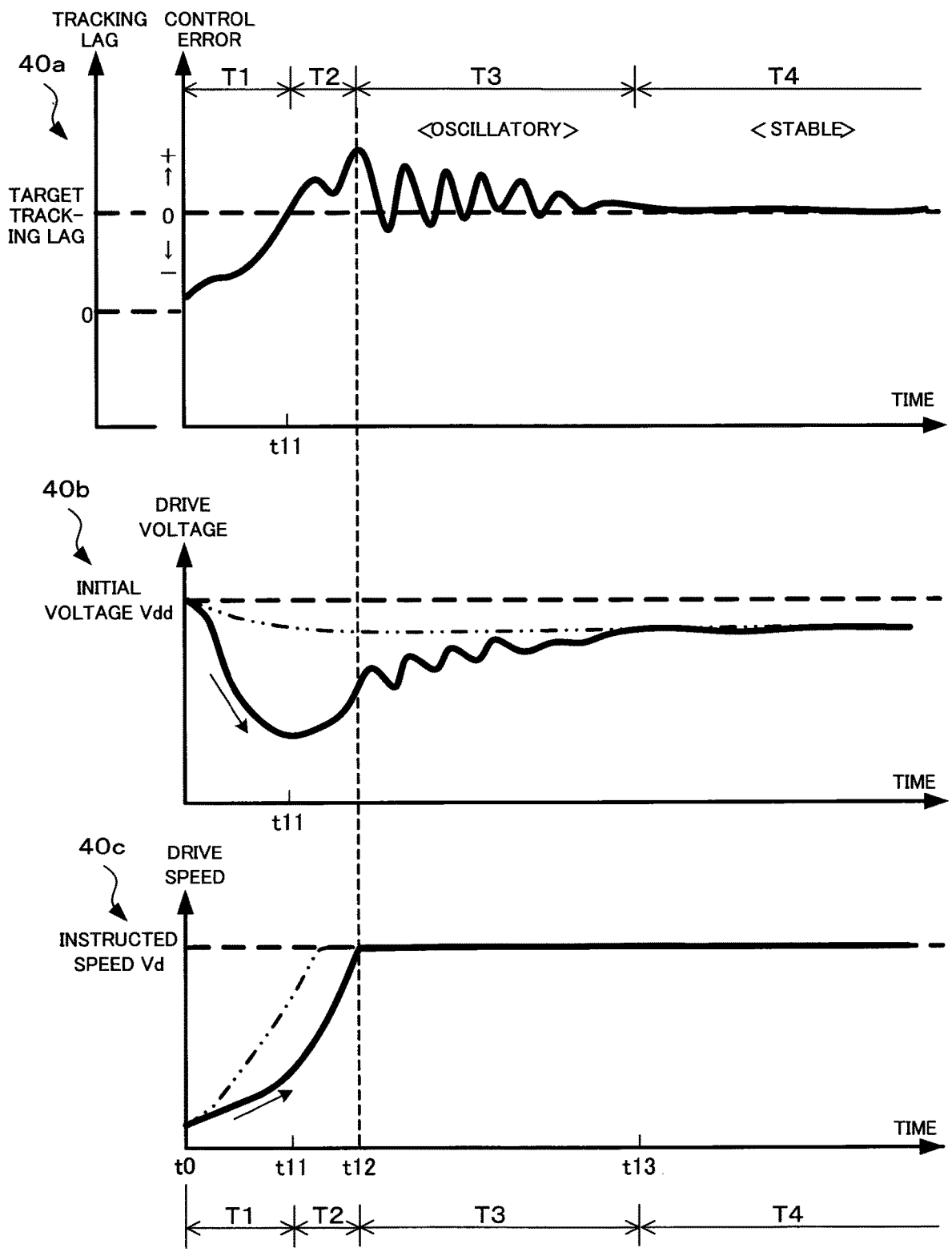
FIG. 4 is a graph showing FB control for a case where control of the first embodiment of the present invention is not carried out.

Since lens drive is carried out at low speed by the stepping motor 6, using the control of the determination flow shown in FIG. 3, speed of moving to FB control (FB commencement speed in step S7) is lowered, and if FB control is attempted from a low-speed state detrimental effects such as shown in FIG. 4 and described below occur.

In FIG. 4, the horizontal axis is time, with time t0 being the time of commencement of feedback control, time t11 being a time at which the control error exceeds 0, t12 being a time at which the drive speed has reached an instructed speed Vd, a period T3 rom time t12 to time t13 being an oscillatory period, and a period T4 From t13 onwards being a stable period.

Also, the vertical axis in the upper graph 4a in FIG. 4 is tracking lag and control error, with the solid line in the graph 4a representing control error. The vertical axis in the middle graph 40b is drive voltage, with a dot and dash line that starts from initial voltage Vdd representing expected voltage change, and the solid line representing actual voltage change. The vertical axis in the lower graph 40c is speed of changing excitation position of the stepping motor, namely drive speed, with the two-dot chain line represents an expected speed change and the solid line representing actual speed change.

In a state where the motor is not being driven, tracking lag is 0, and so immediately after drive commencement becomes a state where tracking lag is small with respect to target tracking lag, that is control deviation (value resulting from subtracting target tracking lag from (actual) tracking lag) becomes minus (refer to period T1 in graph 40a of FIG. 4). Feedback control is therefore commenced from t0 in FIG. 4, after drive commencement. A state where the control error is minus, represents a state where torque of the stepping motor is sufficient with respect to the load, there is a margin with respect to step-out, and feedback control is carried out so as to raise drive speed together with lowering drive voltage. Accordingly, the drive voltage is rapidly reduced from the initial voltage at the time of drive commencement until the control error becomes 0 (refer to period T1 in the graph 40b in FIG. 4). This means that rise in drive speed is restrained resulting in a gradual speed increase (refer to period T1 in graph 40c in FIG. 4). As a result, the time until the drive speed reaches the instructed speed becomes longer.

If the control error approaches 0 and reduction in drive voltage has settled, rise in drive speed towards the instructed speed becomes rapid (refer to period T2 in graph 40c of FIG. 4). Then, once the drive speed reaches the instructed speed Vd, a constant speed is maintained by drive speed control due to the instructed speed being the upper limit (refer to period T3 in the graph 40c in FIG. 4). At this time, since rate of change of the drive speed changes suddenly, motor resonance is generated and it is easy for fluctuation to arise in the control error (refer to period T3 in the graph 40a in FIG. 4). Also, in a state where the drive voltage has lowered, it takes time for convergence of the motor resonance, and there may be cases where the resonance is not converged and step-out occurs.

In period T3, in an isolated region the drive speed becomes constant, but control error fluctuates, and so rotation of the drive shaft 7 of the stepping motor 6 and movement of the lens are vibrational. This means that it takes time until period T4 where the lens becomes constant speed.

Figure 5:
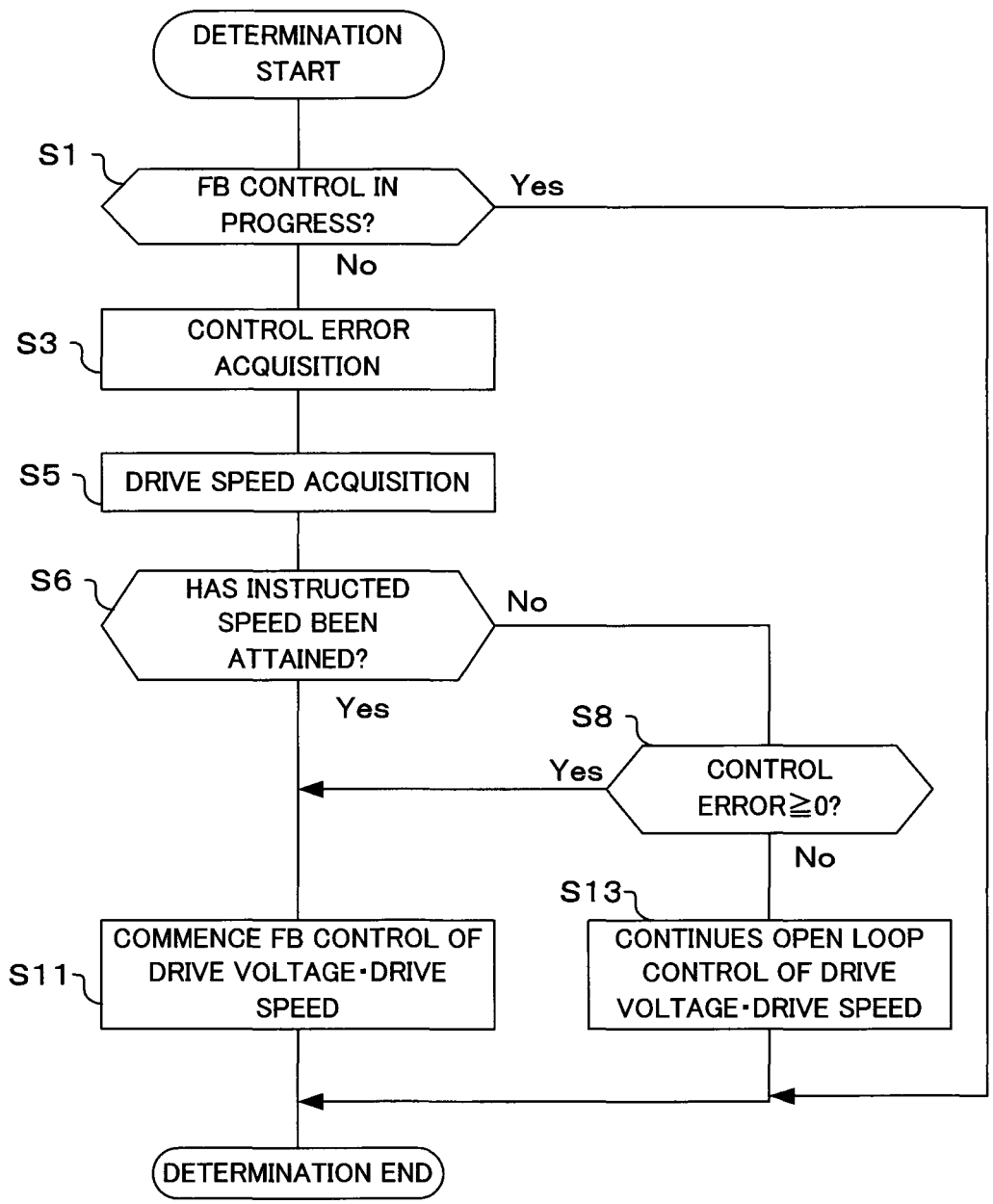
FIG. 5 is a flowchart showing operation of determination control, with the camera of the first embodiment of the present invention.

With this embodiment, therefore, FB control such as shown in FIG. 5 is carried out. FIG. 5 is a flowchart for determining which control to carry out at the time of carrying out lens drive using the stepping motor 6, namely whether to carrying out open loop control or to carry out FB control, and then carrying out open loop control or closed loop control. The flowchart shown in FIG. 5 is executed by the CPU 31 in accordance with a program that has been stored in the memory 39.

In the flowchart shown in FIG. 5, immediately after commencement of lens drive is a state of open loop control with a fixed drive voltage, and a drive speed setting value that has been updated in accordance with an acceleration table for every control period or given drive amount. Also, in drive control, state is periodically observed, and a portion where transition determination to FB control using FB control commencement flow executed within that periodic control is carried out (S1-S5, S11 and S13), is the same as the flowchart shown in FIG. 3.

A specific difference from the flowchart shown in FIG. 3 is in that FB control is commenced after the instructed speed has been attained (refer to S6 which will be described later). Further, there is a difference in the point that even if the instructed speed has not been attained, at a point in time where the control error is positive (namely, when the tracking lag is greater than or equal to the target tracking lag) FB control of the drive voltage and FB control of the drive speed is commenced (refer to S8 which will be described later). Accordingly, in comparing the flowchart shown in FIG. 5 with the flowchart shown in FIG. 3, S1-S5, S11 and S13 are the same and steps S6 and S8 are different. Description will focus on this difference.

If the flow for determination in FIG. 5 is commenced, it is first determined whether or not feedback (FB) control is being carried out (S1). If the result of determination in step S1 is not that FB control is in progress, next a control error value is acquired (S3). Once the control error value has been acquired, next drive speed is acquired (S5).

If drive speed has been acquired, it is next determined whether or not instructed speed has been attained (S6). Here, the drive speed that was acquired in step S5 is compared with instructed speed Vd that has been stored in advance, to determine whether or not this speed has been attained. It should be noted that the instructed speed corresponds to the instructed speed Vd shown in FIG. 2 and FIG. 4 (and similarly for FIG. 5 and FIG. 6 which will be described later).

If the result of determination in step S6 is that the instructed speed has not been attained, it is determined whether or not the control error that was acquired in step S3 is equal to or greater than 0 (S8). Here it is determined whether or not the control error that was acquired in step S3 is greater than or equal to 0.

If the result of determination in step S8 is that the control error is less than 0, open loop control continues for drive voltage and drive speed (S13). On the other hand, if the result of determination in step S6 is that the instructed speed has been attained, or if the result of determination in step S8 is that the control error value is greater than or equal to 0, control of drive voltage and drive speed using FB control is commenced (S11).

Figure 6:
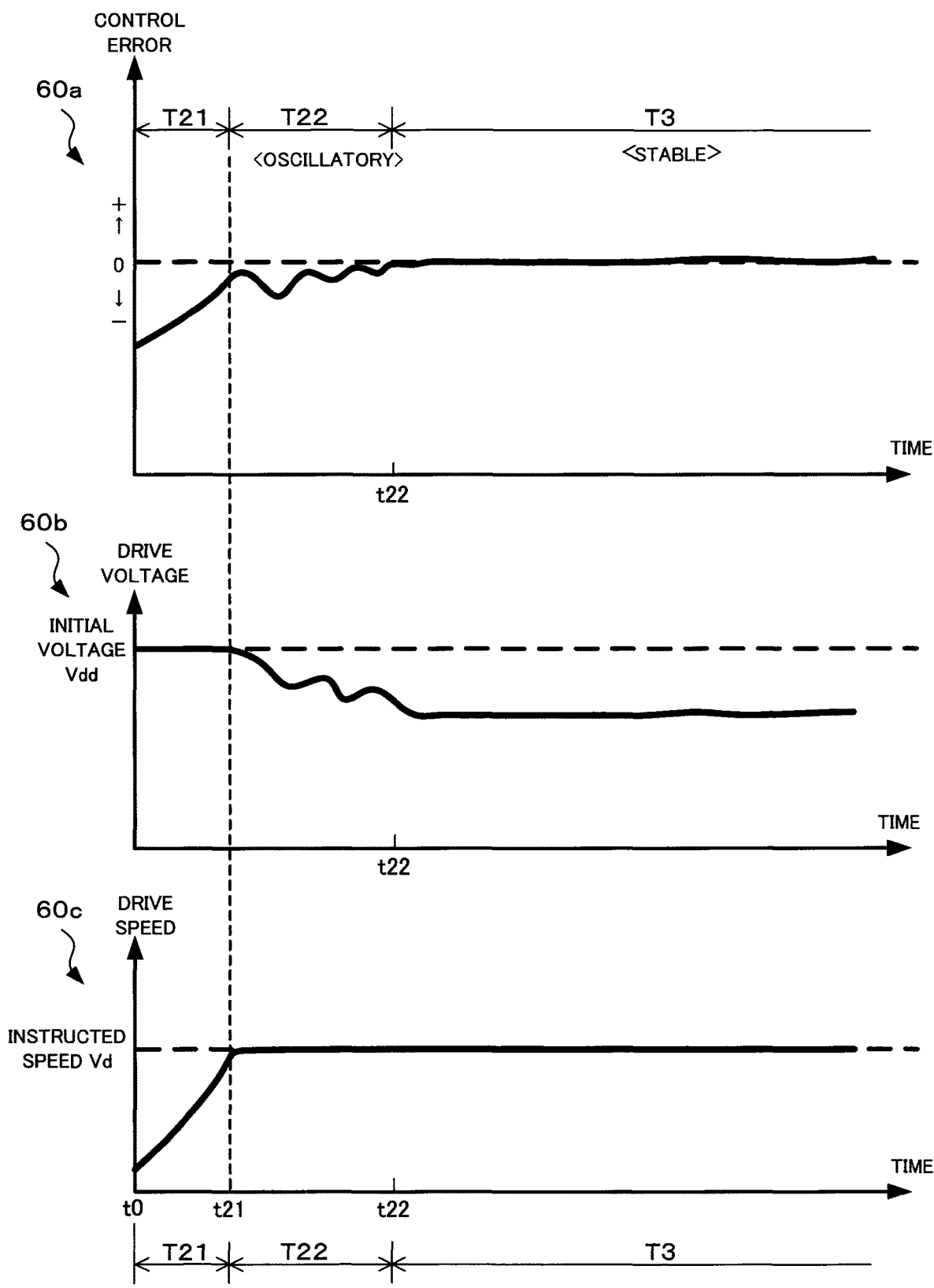
FIG. 6 is graphs showing FB control for case where instructed speed is low, and FB control is commenced after drive commencement, with the camera of the first embodiment of the present invention.
Figure 7:
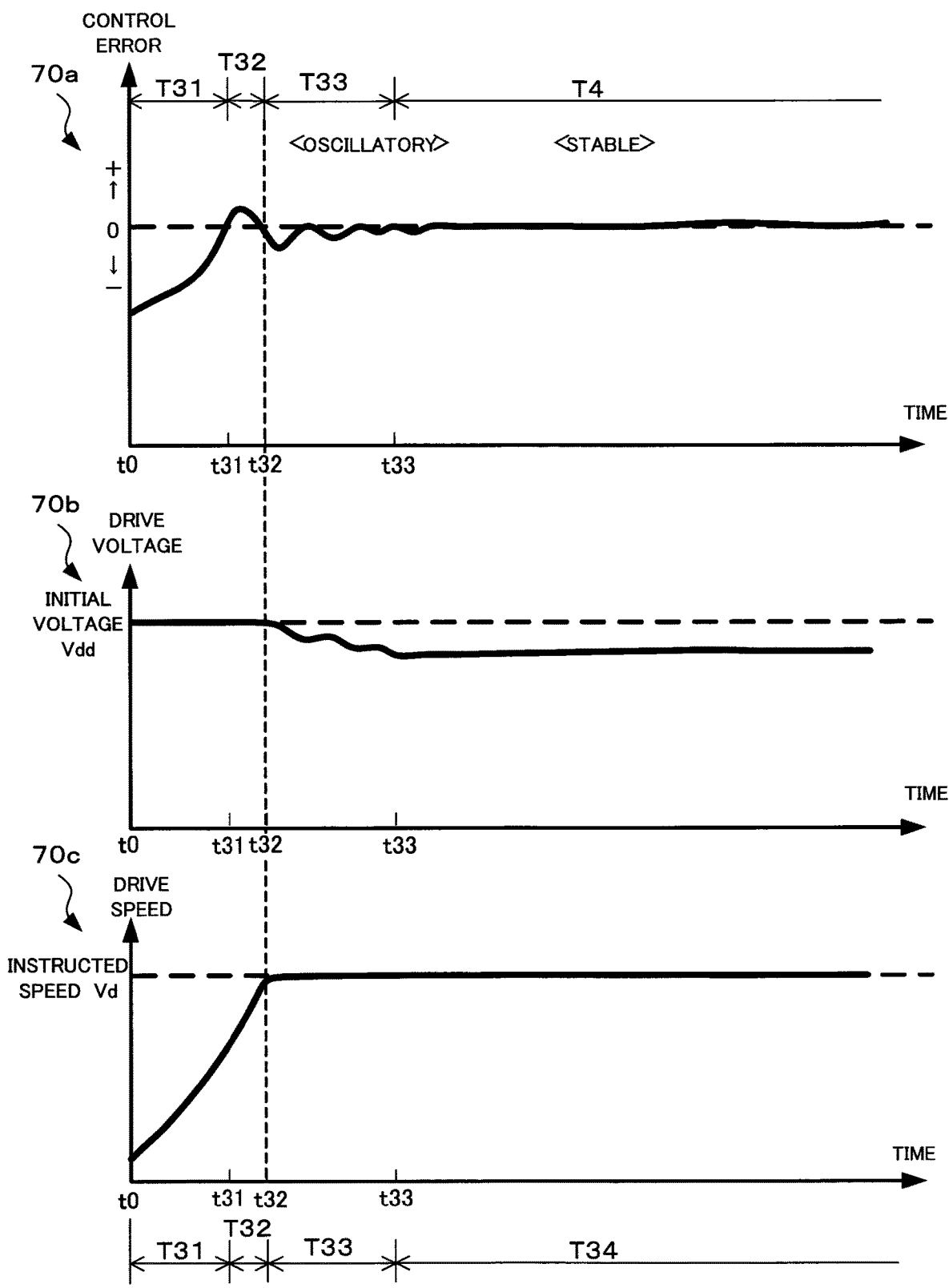
FIG. 7 is graphs showing FB control for case where instructed speed is slightly low, with the camera of the first embodiment of the present invention.

Next, an example of a case where FB control determination has been carried out based on the flowchart shown in FIG. 5 will be described using FIG. 6 and FIG. 7. The horizontal axis and vertical axis of FIG. 6 and FIG. 7 are the same as in the example shown in FIG. 4. FIG. 6 is an example where instructed speed Vd is sufficiently low and FB control is commenced at a point in time when instructed speed Vd has been attained, and FIG. 7 is an example where instructed speed Vd is slightly low and FB control is commenced at a point in time where the control error is greater than or equal to 0 before instructed speed is attained.

In either of the cases of FIG. 6 and FIG. 7, after commencement of drive the drive voltage is fixed to a high initial voltage Vdd (refer to graphs 60b and 70b), and drive speed gradually increases in accordance with an acceleration table (refer to graphs 60c and 70c). Since FB control is not being carried out, there is no lowering of the drive voltage (refer to period T21 in graph 60b), there is no step-out as long as within a load torque range assumed by design, and it is possible to raise speed towards the instructed speed in a short time.

With the example shown in FIG. 6, if the control error is not greater than or equal to 0 until such time as the instructed speed Vd is attained, FB control is commenced at time point t21 when instructed speed Vd is attained. If FB control has commenced speed control generally coincides with the instructed speed (refer to period T22 in graph 60c), and oscillation of control error caused by motor resonance is suppressed by drive voltage control (referred to period T22 in graph 60a). At this time, since the drive voltage is controlled to a high-voltage approaching the initial voltage, it is possible to rapidly control motor resonance, and it is possible to quickly control to a stable state (refer to period T22 in graph 60b).

Also, with the example shown in FIG. 7, if control error becomes greater than or equal to 0 before instructed speed Vd is obtained, FB control is commenced at that point in time t31. In the state where the control error is greater than or equal to 0, the designed safety factor becomes small, but by commencing FB control not only is it possible to reliably prevent step-out, but drive voltage is controlled with drive voltage in the initial high-voltage state (before voltage is lowered), and it is possible to rapidly control motor resonance (refer to periods T32 and T33 in graph 70a).

In this way, with this embodiment, during an acceleration operation of the stepping motor 6 (period T21 in FIG. 6, period T31 in FIG. 7) at least drive voltage is subjected to open loop control (S11 n FIG. 5), while there is also a transition to closed loop control of the drive voltage when the acceleration operation has been completed (S13 in FIG. 5, t21 in FIG. 6, and t31 in FIG. 7) and closed loop control of the drive voltage and the drive speed is carried out in accordance with control error. This means that FB control is carried out from low speed to high speed and it is possible to reduce power consumption.

Also, with this embodiment, even during an acceleration operation, if the tracking lag becomes greater than or equal to the target tracking lag (S8 Yes in FIG. 5) there is a forced transition to closed loop control of the drive voltage, and closed loop control of the drive voltage and the drive speed in accordance with the control error is carried out (S11 in FIG. 5).

Next, a second embodiment of the present invention will be described using FIG. 8. With the first embodiment time of commencing speed FB control and voltage FB control was the same. With the second embodiment however, the time of commencing speed FB control and the time of commencing voltage FB control are different. The structure of the second embodiment is similar to structure of the first embodiment shown in FIG. 1, and so detailed description will be omitted.

The FB control determination operation of this embodiment will be described using the flowchart shown in FIG. 8. It should be noted that the flowchart shown in FIG. 8 is executed by the CPU 31 in accordance with a program that has been stored in the memory 39.

Figure 8:
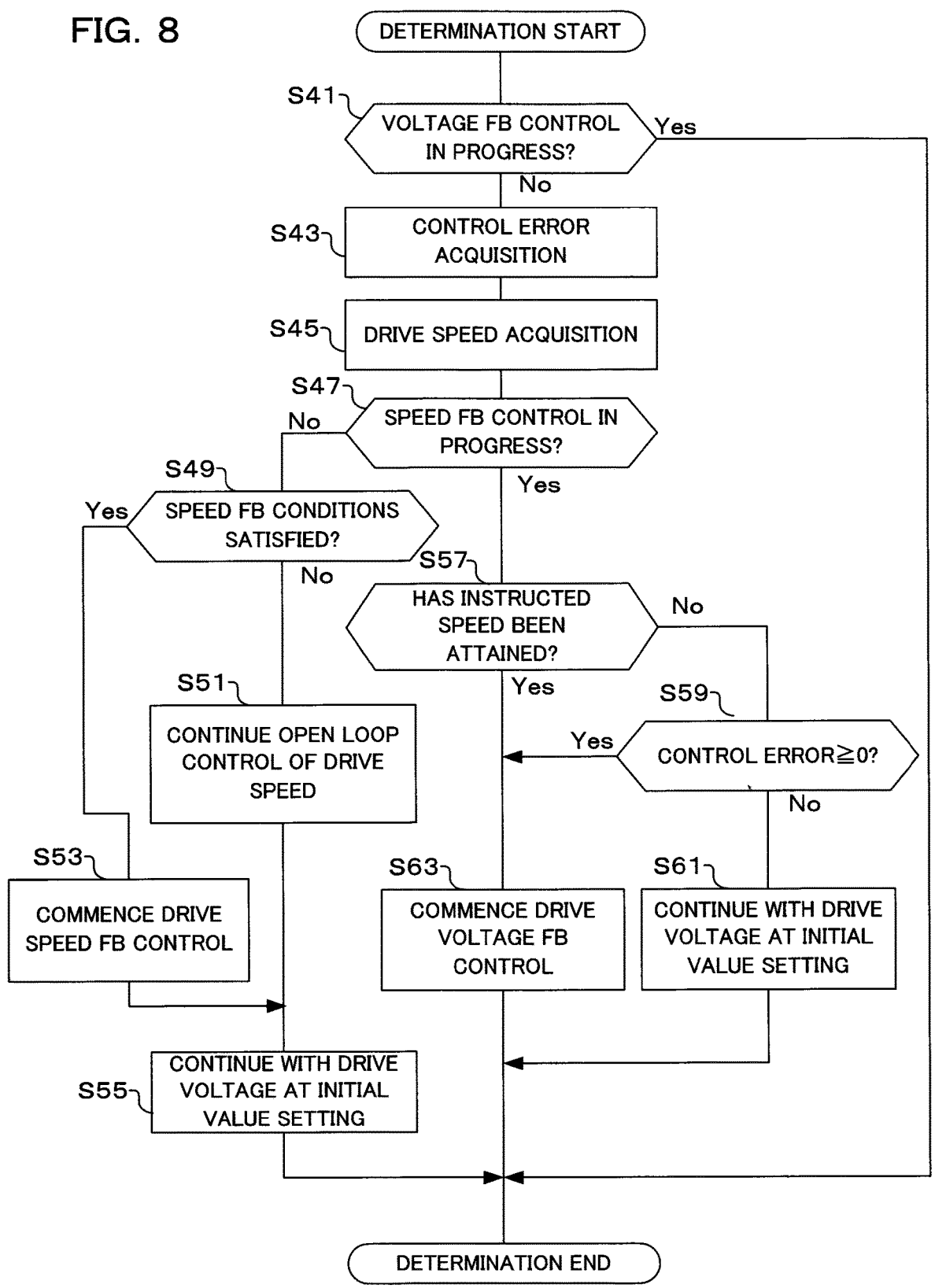
FIG. 8 is a flowchart showing operation of determination control, with the camera of a second embodiment of the present invention.

If the flow for FB control determination shown in FIG. 8 is entered, it is first determined whether or not voltage FB control is in progress (S41). With this embodiment also, immediately after drive of the stepping motor 6 has been commenced, both drive speed and drive voltage are subjected to open loop control (open control), and voltage FB control commences in step S63, which will be described later. In this step S41 it is determined whether or not voltage FB control has been commenced in step S63. If the result of this determination is that voltage FB control is in progress, FB control continues for drive speed and drive voltage, and this flow is terminated.

If the result of determination in step S41 is that voltage FB control is not being carried out, next, similarly to step S3, a control error is acquired (S43). Once the control error value has been acquired, next, similarly to step S5, drive speed is acquired (S45).

If drive speed has been acquired, it is next determined whether or not speed FB control is in progress (S47). As was described previously, there is open loop control (open control) for both drive speed and drive voltage immediately after drive of the stepping motor 6 has been commenced, and in this step it is determined whether or not FB control is being performed for speed control. It should be noted that in step S53, which will be described later, FB control is commenced for speed control.

If the result of determination in step S47 is that speed FB control is not being performed, it is determined whether or not speed FB conditions have been satisfied (S49). Here it is determined whether or not the drive speed satisfies given conditions (for example, greater than or equal to a given drive speed that has been set lower than instructed speed) and whether or not the control error satisfies given conditions. However, this is not limiting and it is possible perform determination using only one or the other, or using other conditions.

If the result of determination in step S49 is that speed FB conditions have not been satisfied, open loop control continues for drive speed (S51). This means that open loop control continues to be carried out for both drive speed and drive voltage.

On the other hand, if the result of determination in step S49 is that speed FB conditions have been satisfied, FB control is commenced for drive speed (S53). Here, interval of a signal relating to drive speed of the motor output from the CPU 31 2-D motor drive circuit 24, namely a clock signal that changes excitation position of the stepping motor 6, is changed based on the control error.

If the open loop control of the drive speed continues in step S51, or if FB control of the drive speed is commenced in step S53, processing continues with drive voltage at the initial value setting (S55). Applied voltage of the stepping motor 6 is kept at the initial voltage Vdd. That is, even if there is a switch to FB control for drive speed, the drive voltage remains at the initial voltage Vdd.

Returning to step S47, if the result of determination is that speed FB control is in progress, it is next determined whether or not the instructed speed has been attained (S57). Here, it is determined whether or not the drive speed that was acquired in step S45 has reached the instructed speed Vd.

If the result of determination in step S57 is that drive speed has not reached the instructed speed Vd, it is determined whether or not the control error is greater than or equal to 0 (S59). Here it is determined whether or not the control error that was acquired in step S43 is greater than or equal to 0.

If the result of determination in step S59 is that the control error is less than 0, a state where the drive voltage has been set to the initial value continues (S61). Here FB control is being performed for drive speed, but for drive voltage the open loop control continues, and so is kept set to the initial voltage Vdd.

On the other hand, if the result of determination in step S57 is that the drive speed has reached the instructed speed Vd, or if the result of determination in step S59 is that the control error is greater than or equal to 0, FB control is commenced for drive voltage (S63). Here, among the setting signals output from the CPU 31 to the motor drive circuit 24, a signal relating to drive voltage of the motor, namely a voltage to be applied to the stepping motor 6, is changed based on the control error.

If the state where the drive voltage is set to the initial value continues in step S55 or S61, or if FB control for the drive voltage is commenced in step S63, the flow for determination is temporarily terminated. It should be noted that with the second embodiment also, if drive of the stepping motor 6 is commenced, the flow for determination is repeatedly executed at given intervals until drive is stopped.

In this way, with this embodiment, there is first a transition to speed FB control, and after that, there is a transition to voltage FB control under the same conditions as the conditions of the first embodiment. Transition conditions for the speed FB control may be set using FB control commencement speed (given speed) and control error conditions.

With the second embodiment, since there is first a transition to speed FB control with the initial high drive voltage kept as it is, then compared to the first embodiment where speed is controlled in accordance with a fixed acceleration table until instructed speed or FB control commencement, it is possible to reach the instructed speed faster if there is a margin with respect to load. Also, even if there is a temporary increase in load due to disturbance during acceleration, there is the advantage that it is possible to prevent step-out using speed control.

As has been described above, with each of the embodiments of the present invention, the CPU 31 carries out drive control of the stepping motor 6 based on data relating to drive speed and drive voltage of the stepping motor 6 that has been stored in the memory 39 (refer, for example, to S13 in FIG. 5, period T21 in FIG. 6, T31 in FIG. 7, etc.). The CPU 31 here functions as an open loop control section that performs open loop control of the stepping motor using a given excitation position change and a given drive voltage.

Also, with each of the embodiments of the present invention, the CPU 31 carries out drive control of the stepping motor 6 based on control error and drive speed that have been output based on data that has been input to the CPU 31 by the GMR sensor 9, A/D converter 33, and up down counter 34 (refer, for example, to S11 in FIG. 5, period T22 in FIG. 6, periods T32 and T33 in FIG. 7, etc.). Here, the CPU 31 functions as a closed loop control section that detects rotational position of the stepping motor, at the time of rotating the stepping motor calculates tracking lag for change in rotational position for change in excitation position, and performs closed loop control of drive speed and drive voltage of the stepping motor in accordance with a control error, which is a difference between target tracking lag and tracking lag.

Also, with each of the embodiments of the present invention, at least open loop control of drive voltage during an acceleration operation of the stepping motor is performed (for example, S13 in FIG. 5), as well as closed loop control of drive voltage and drive speed in accordance with control error by transitioning to closed loop control of drive voltage when an acceleration operation is completed (for example, S6 Yes→S11 in FIG. 5). This means that FB control is carried out from low speed to high speed and it is possible to reduce power consumption. Specifically, since open loop control is carried out until the acceleration operation is complete, there is no lowering of drive voltage (refer to period T1 in graph 40b of FIG. 4 and period T21 in graph 60b of FIG. 6), and this means that it is possible for the drive speed to reach instructed speed Vd in a short time (refer, for example, to period T1 in graph 40c of FIG. 4 and period T21 in graph 60c of FIG. 6).

Also, with each of the embodiments of the present invention, regarding the closed loop control section, even during an acceleration operation, if the tracking lag becomes greater than or equal to the target tracking lag there is a forced transition to closed loop control of the drive voltage, and closed loop control of the drive voltage and the drive speed is carried out in accordance with the control error (refer, for example, to S8 Yes→S11 in FIG. 5 and period T22 in graph 70a of FIG. 7). Since tracking lag is removed it is possible to prevent step-out by carrying out closed loop control, while at the same time it is possible to achieve stability in a short time by carrying out voltage control without excessively lowering the drive voltage. Also, with each of the embodiments of the present invention, the closed loop control section determines that an acceleration operation is complete once drive speed reaches an instructed speed that has been stored in advance (refer, for example to S6 Yes→S11 in FIG. 5).

Also, with the second embodiment of the present invention, the closed loop control section, when drive speed of the stepping motor satisfies given conditions, first carries out closed loop control so as to achieve drive speed in accordance with control error (for example, S49 Yes→S53 in FIG. 8), and then the closed loop control section, if the acceleration operation is complete or if tracking lag becomes greater than or equal to target tracking lag, carries out closed loop control so as to achieve drive voltage in accordance with control error (for example, S57 Yes or S59 Yes→S63 in FIG. 8). This means that it is possible to reach the instructed speed more quickly if there is a margin with regard to load, and even if there is a temporary increase in load due to disturbance during acceleration it is possible to prevent step-out using speed control. It should be noted that as a given condition the drive speed may be greater than or equal to a given speed, stored in advance, that is lower than instructed speed (refer, for example, to S49 in FIG. 8). The closed loop control section also determines that the acceleration operation is complete if drive speed reaches the instructed speed (refer, for example, to S57 Yes in FIG. 8).

Also, with each of the embodiments of the present invention, the GMR sensor 9 has been used for rotational position detection of the stepping motor 6 in order to carryout FB control, but this is not limiting and any position sensor may be used that is capable of detecting position, such as an optical encoder.

Also, with each of the embodiments of the present invention, some or all of the peripheral circuits of the CPU 31 may be implemented using a CPU (Central Processing Unit) and program code, may be implemented by circuits that are executed by program code such as a DSP (Digital Signal Processor), may use a hardware structure such as gate circuits that are generated based on a programming language described using Verilog, or may be executed using hardware circuits. Also, some functions of the CPU 31 may be implemented by circuits that are executed by program code such as a DSP, may use a hardware structure such as gate circuits that are generated based on a programming language described using Verilog, or may be executed using hardware circuits.

Also, with this embodiment, an instrument for taking pictures has been described using a digital camera, but as a camera it is also possible to use a digital single lens reflex camera or a compact digital camera, or a camera for movie use such as a video camera, and further to have a camera that is incorporated into a mobile phone, a smartphone, a mobile information terminal, personal computer (PC), tablet type computer, game console etc., a medical camera, or a camera for a scientific instrument such as a microscope, a camera for mounting on a vehicle, a surveillance camera etc. In any event, it is possible to adopt the present invention as long as a device carries out drive control of a lens.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A lens drive device, comprising:
a sensor that detects rotational position of a stepping motor and
a controller that controls the stepping motor, the controller comprising:
an open loop control section that performs open loop control of the stepping motor using a given excitation position change and a given drive voltage, and
a closed loop control section that, at the time of rotating the stepping motor, calculates tracking lag for change in rotational position for change in excitation position, and performs closed loop control of drive speed and drive voltage of the stepping motor in accordance with a control error, which is a difference between target tracking lag and tracking lag, wherein
the closed loop control section performs at least open loop control of drive voltage during an acceleration operation of the stepping motor, as well as closed loop control of drive voltage and drive speed in accordance with control error by transitioning to closed loop control of drive voltage when an acceleration operation is completed.

2. The lens drive device of claim 1, wherein:
the closed loop control section, even during an acceleration operation, forcibly transitions to closed loop control of drive voltage if the tracking lag becomes greater than or equal to target tracking lag, and carries out closed loop control of drive voltage and drive speed in accordance with control error.

3. The lens drive device of claim 1, wherein:
the closed loop control section determines that the acceleration operation is complete if the drive speed reaches an instructed speed that is stored in advance.

4. The lens drive device of claim 1, wherein:
the closed loop control section, in the event that the drive speed of the stepping motor satisfies a given condition, first carries out closed loop control so as to achieve drive speed in accordance with the control error, and then, if the acceleration operation is complete, or if the tracking lag becomes greater than or equal to target tracking lag, carries out closed loop control so at to achieve drive voltage in accordance with the control error.

5. The lens drive device of claim 4, wherein:
the given condition is that the drive speed is greater than or equal to a given speed that is lower than the instructed speed that is stored in advance, and the closed loop control section determines that the acceleration operation is complete if the drive speed reaches the instructed speed.

6. A lens drive method, that carries out open loop control of a stepping motor using a given excitation position change and a given drive voltage, detects rotational position of the stepping motor, calculates tracking lag of change in rotational position for change in excitation position, when the stepping motor is made to rotate, and performs closed loop control of drive speed and drive voltage of the stepping motor in accordance with a control error, which is a difference between target tracking lag and tracking lag, the lens drive method further comprising:
performing at least open loop control of drive voltage during an acceleration operation of the stepping motor, as well as closed loop control of drive voltage and drive speed in accordance with control error by transitioning to closed loop control of drive voltage when an acceleration operation is completed.

7. The lens drive method of claim 6, further comprising even during an acceleration operation, forcibly transitioning to closed loop control of drive voltage if the tracking lag becomes greater than or equal to target tracking lag, and carrying out closed loop control of drive voltage and drive speed in accordance with control error.

8. The lens drive method of claim 6, further comprising determining that the acceleration operation is complete if the drive speed reaches an instructed speed that is stored in advance.

9. The lens drive method of claim 6, further comprising in the event that the drive speed of the stepping motor satisfies a given condition, first carrying out closed loop control so as to achieve drive speed in accordance with the control error, and then, if the acceleration operation is complete, or if the tracking lag becomes greater than or equal to target tracking lag, carrying out closed loop control so at to achieve drive voltage in accordance with the control error.

10. The lens drive method of claim 9, wherein:
the given condition is that the drive speed is greater than or equal to a given speed that is lower than the instructed speed that is stored in advance, and it is determined that the acceleration operation is complete if the drive speed reaches the instructed speed.

11. A non-transitory computer-readable medium, storing a processor executable code, which when executed by at least one processor, performs a lens drive method, processor executable code executing a lens drive method for a lens drive device that performs open loop control of the stepping motor using a given excitation position change and a given drive voltage, detects rotational position of the stepping motor, calculates tracking lag of change in rotational position for change in excitation position when the stepping motor is made to rotate, and performs closed loop control of drive speed and drive voltage of the stepping motor in accordance with a control error, which is a difference between target tracking lag and tracking lag, the lens drive method comprising:

performing at least open loop control of drive voltage during an acceleration operation of the stepping motor, as well as closed loop control of drive voltage and drive speed in accordance with control error by transitioning to closed loop control of drive voltage when an acceleration operation is completed.

12. The storage medium of claim 11, wherein the lens drive method further comprises:
even during an acceleration operation, forcibly transitioning to closed loop control of drive voltage if the tracking lag becomes greater than or equal to target tracking lag, and carrying out closed loop control of drive voltage and drive speed in accordance with control error.

13. The storage medium of claim 11, wherein the lens drive method further comprises:
determining that the acceleration operation is complete if the drive speed reaches an instructed speed that is stored in advance.

14. The storage medium of claim 11, wherein the lens drive method further comprises:
in the event that the drive speed of the stepping motor satisfies a given condition, first carrying out closed loop control so as to achieve drive speed in accordance with the control error, and then, if the acceleration operation is complete, or if the tracking lag becomes greater than or equal to target tracking lag, carrying out closed loop control so as to achieve drive voltage in accordance with the control error.

15. The storage medium of claim 14, wherein:
the given condition is that the drive speed is greater than or equal to a given speed that is lower than the instructed speed that is stored in advance, and it is determined that the acceleration operation is complete if the drive speed reaches the instructed speed.

* * * * *